United States Patent
Wang et al.

(10) Patent No.: US 11,234,251 B2
(45) Date of Patent: Jan. 25, 2022

(54) GENERIC CONTROL CHANNEL CONFIGURATION FOR NEW RADIO SIDELINK

(71) Applicant: AT&T Intellectual Property I, L.P., Atlanta, GA (US)

(72) Inventors: Xiaoyi Wang, Austin, TX (US); Ralf Bendlin, Cedar Park, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 16/366,347

(22) Filed: Mar. 27, 2019

(65) Prior Publication Data

US 2020/0059940 A1 Feb. 20, 2020

Related U.S. Application Data

(60) Provisional application No. 62/765,139, filed on Aug. 17, 2018.

(51) Int. Cl.
| | | |
|---|---|---|
| *H04W 72/12* | (2009.01) | |
| *H04L 12/24* | (2006.01) | |
| *H04L 5/00* | (2006.01) | |

(52) U.S. Cl.
CPC ....... *H04W 72/1205* (2013.01); *H04L 5/0055* (2013.01); *H04L 41/0806* (2013.01); *H04W 72/1278* (2013.01)

(58) Field of Classification Search
CPC .......... H04W 72/1205; H04W 72/1278; H04L 5/0055; H04L 41/0806
See application file for complete search history.

(56) References Cited

U.S. PATENT DOCUMENTS

| | | |
|---|---|---|
| 8,385,931 B2 | 2/2013 | Landstrom et al. |
| 8,582,638 B2 | 11/2013 | Earnshaw et al. |

(Continued)

FOREIGN PATENT DOCUMENTS

| | | |
|---|---|---|
| CN | 107872888 A | 4/2018 |
| EP | 3 282 719 A1 | 2/2018 |

(Continued)

OTHER PUBLICATIONS

5G Americas., "V2X Cellular Solutions," URL: http://www.5gamericas.org/files/2914/7769/1296/5GA_V2X_Report_FINAL_for_upload.pdf, Oct. 2016, 37 pages.

(Continued)

*Primary Examiner* — Alpus Hsu
*Assistant Examiner* — Camquyen Thai
(74) *Attorney, Agent, or Firm* — Amin, Turocy & Watson, LLP

(57) ABSTRACT

Aspects of the technology described herein are directed towards using generic control information in a three-party wireless communication system to schedule a data transmission and reception of the data transmission. A scheduler node transmits the generic control information, comprising identification information that identifies a user equipment device as a transmitter node, and scheduling information that schedules a data transmission. For unicast data transmissions, the generic control information further identifies a receiver node, and can schedule transmission of an ACK/NACK from the receiver node corresponding to receiving the data transmission. A control procedure can be configured in a user equipment device by linking a channel configuration dataset to a resource configuration dataset, which in turn is linked to a channel transmit and receive configuration dataset. Reconfiguration is achieved by changing the linking(s) between one or more different available datasets.

20 Claims, 12 Drawing Sheets

(56) References Cited

U.S. PATENT DOCUMENTS

| | | | |
|---|---|---|---|
| 8,682,376 | B2 | 3/2014 | Franceschini et al. |
| 9,351,310 | B2 | 5/2016 | Lagerqvist et al. |
| 9,370,001 | B2 | 6/2016 | Kim et al. |
| 9,391,736 | B2 | 7/2016 | Nazar et al. |
| 9,450,714 | B2 | 9/2016 | Hwang et al. |
| 9,756,653 | B2 | 9/2017 | Kim et al. |
| 9,768,942 | B2 | 9/2017 | von Elbwart et al. |
| 9,844,071 | B2 | 12/2017 | Ostergaard et al. |
| 10,111,246 | B2 | 10/2018 | Zhang et al. |
| 10,159,061 | B2 | 12/2018 | Zhao et al. |
| 10,165,556 | B2 | 12/2018 | Chu et al. |
| 10,595,363 | B2 | 3/2020 | Wang et al. |
| 2011/0134827 | A1 | 6/2011 | Hooli et al. |
| 2012/0044890 | A1 | 2/2012 | Jen |
| 2012/0287844 | A1 | 11/2012 | Ophir et al. |
| 2013/0195026 | A1* | 8/2013 | Johnsson ............ H04W 72/042 370/329 |
| 2013/0208653 | A1 | 8/2013 | Morioka et al. |
| 2013/0322413 | A1* | 12/2013 | Pelletier ................ H04W 76/14 370/336 |
| 2014/0036704 | A1 | 2/2014 | Han et al. |
| 2014/0078971 | A1* | 3/2014 | Bontu ................... H04W 8/005 370/329 |
| 2014/0171062 | A1 | 6/2014 | Fallgren et al. |
| 2014/0177540 | A1 | 6/2014 | Novak et al. |
| 2014/0177586 | A1 | 6/2014 | Jang et al. |
| 2014/0256369 | A1* | 9/2014 | Ji ...................... H04W 56/0025 455/500 |
| 2014/0335866 | A1 | 11/2014 | Velde et al. |
| 2015/0146633 | A1* | 5/2015 | Kalhan ................ H04L 1/1607 370/329 |
| 2015/0181587 | A1* | 6/2015 | Yang .................... H04L 1/1861 370/329 |
| 2015/0271755 | A1 | 9/2015 | Karri et al. |
| 2016/0205714 | A1 | 7/2016 | Morita et al. |
| 2016/0295565 | A1* | 10/2016 | Kim .................. H04W 72/0453 |
| 2016/0345167 | A1 | 11/2016 | Li et al. |
| 2016/0374051 | A1 | 12/2016 | Morita |
| 2017/0006586 | A1 | 1/2017 | Gulati et al. |
| 2017/0013466 | A1 | 1/2017 | Xu et al. |
| 2017/0026997 | A1 | 1/2017 | Moulsley |
| 2017/0048905 | A1 | 2/2017 | Yun et al. |
| 2017/0064731 | A1 | 3/2017 | Wang et al. |
| 2017/0086028 | A1 | 3/2017 | Hwang et al. |
| 2017/0086114 | A1 | 3/2017 | Jung et al. |
| 2017/0134080 | A1 | 5/2017 | Rahman et al. |
| 2017/0135105 | A1 | 5/2017 | Li et al. |
| 2017/0201461 | A1 | 7/2017 | Cheng et al. |
| 2017/0208568 | A1 | 7/2017 | Nam et al. |
| 2017/0245245 | A1 | 8/2017 | Kim et al. |
| 2017/0273094 | A1 | 9/2017 | Cheng et al. |
| 2017/0280469 | A1 | 9/2017 | Park et al. |
| 2017/0289733 | A1 | 10/2017 | Rajagopal et al. |
| 2017/0295601 | A1 | 10/2017 | Kim et al. |
| 2017/0331670 | A1 | 11/2017 | Parkvall et al. |
| 2017/0339676 | A1 | 11/2017 | Belghoul et al. |
| 2017/0353971 | A1 | 12/2017 | Gupta et al. |
| 2017/0366311 | A1 | 12/2017 | Iyer et al. |
| 2018/0007606 | A1 | 1/2018 | Lee et al. |
| 2018/0035435 | A1 | 2/2018 | Gupta et al. |
| 2018/0041956 | A1 | 2/2018 | Abraham et al. |
| 2018/0042023 | A1 | 2/2018 | Sheng |
| 2018/0049084 | A1 | 2/2018 | Lee et al. |
| 2018/0049219 | A1 | 2/2018 | Gupta et al. |
| 2018/0049274 | A1 | 2/2018 | Kim et al. |
| 2018/0069928 | A1 | 3/2018 | Martin et al. |
| 2018/0070369 | A1 | 3/2018 | Papasakellariou |
| 2018/0076839 | A1 | 3/2018 | Baghel et al. |
| 2018/0092122 | A1 | 3/2018 | Babaei et al. |
| 2018/0124574 | A1 | 5/2018 | Byun et al. |
| 2018/0184270 | A1 | 6/2018 | Chun et al. |
| 2018/0192405 | A1* | 7/2018 | Gong .................... H04L 1/0045 |
| 2018/0199317 | A1 | 7/2018 | Hwang et al. |
| 2018/0213554 | A1 | 7/2018 | Zeng et al. |
| 2018/0220398 | A1 | 8/2018 | Wilson et al. |
| 2018/0220415 | A1 | 8/2018 | Yin et al. |
| 2018/0227942 | A1 | 8/2018 | Hwang et al. |
| 2018/0227949 | A1 | 8/2018 | Tiirola et al. |
| 2018/0234973 | A1 | 8/2018 | Lee et al. |
| 2018/0359773 | A1 | 12/2018 | Tesanovic |
| 2019/0068996 | A1 | 2/2019 | Ananthanarayanan et al. |
| 2019/0246421 | A1 | 8/2019 | Zhou et al. |
| 2020/0022089 | A1 | 1/2020 | Guo |
| 2020/0029318 | A1 | 1/2020 | Guo |
| 2020/0092685 | A1 | 3/2020 | Fehrenbach et al. |
| 2020/0106566 | A1 | 4/2020 | Yeo et al. |
| 2020/0120458 | A1 | 4/2020 | Aldana et al. |

FOREIGN PATENT DOCUMENTS

| | | | |
|---|---|---|---|
| KR | 20180039472 | A | 4/2018 |
| WO | 2016/106713 | A1 | 7/2016 |
| WO | 2017/007104 | A1 | 1/2017 |
| WO | 2017/126266 | A1 | 7/2017 |
| WO | 2017/133646 | A1 | 8/2017 |
| WO | 2017/162040 | A1 | 9/2017 |
| WO | 2017/164141 | A1 | 9/2017 |
| WO | 2017/171528 | A1 | 10/2017 |
| WO | 2017/171909 | A1 | 10/2017 |
| WO | 2017/173133 | A1 | 10/2017 |
| WO | 2017/176097 | A1 | 10/2017 |
| WO | 2017196215 | A1 | 11/2017 |
| WO | 2018/031623 | A1 | 2/2018 |
| WO | 2018/059701 | A1 | 4/2018 |
| WO | 2018/062454 | A1 | 4/2018 |
| WO | 2018/062948 | A1 | 4/2018 |
| WO | 2018/064179 | A1 | 4/2018 |
| WO | 2018/067400 | A1 | 4/2018 |
| WO | 2018/080568 | A1 | 5/2018 |
| WO | 2018/080629 | A1 | 5/2018 |
| WO | 2018/084520 | A1 | 5/2018 |
| WO | 2018/084590 | A1 | 5/2018 |
| WO | 2018/112322 | A2 | 6/2018 |
| WO | 2018/113947 | A1 | 6/2018 |
| WO | 2018/139892 | A1 | 8/2018 |
| WO | 2018/144899 | A1 | 8/2018 |
| WO | 2018/145067 | A1 | 8/2018 |
| WO | 2018/147996 | A1 | 8/2018 |
| WO | 2019177783 | A1 | 9/2019 |

OTHER PUBLICATIONS

Ruckebusch et al., "WiSHFUL: enabling coordination solutions for managing heterogeneous wireless Networks", URL: https://biblio.ugent.be/publication/8541159/file/8541162.pdf, IEEE Communications Magazine, vol. 55, No. 9, 2017, pp. 1-9.

Zervas et al., "Service-Oriented Multigranular Optical Network Architecture for Clouds", URL: http://repository.essex.ac.uk/3757/1/05594024.pdf, Journal of Optical Communications and Networking, IEEE/OSA, vol. 2, No. 10, 2010, pp. 883-891.

Sykora et al., "Cooperative Strategies and Networks", URL: https://pdfs.semanticscholar.org/912f/4ab9c15ce35c16e9569c5680ff471fd0cb1c.pdf, Cooperative radio communications for green smart environments, River Publishers, 2016, pp. 271-304.

Dieudonne et al., "Deliverable D2.5 Report on 5G evolution (third revision)", URL: https://www.triangle-project.eu/wp-content/uploads/2018/04/TRIANGLE_Deliverable_D2-5.pdf, Project: H2020-ICT-688712, Ver. 1.0, Mar. 2018, 83 pages.

Friedman, Larry, "SimpliciTI: Simple Modular RF Network Specification", URL: http://vip.gatech.edu/wiki/images/a/ad/SimpliciTI+Specification.pdf, Version 1.09, 2007, 34 pages.

Apostolaras et al., "Evolved User Equipment for Collaborative Wireless Backhauling in Next Generation Cellular Networks", URL: http://nitlab.inf.uth.gr/NITlab/papers/[Apostolaras [SECON15] [Evolved%20UEs].pdf, 12th Annual IEEE International Conference on Sensing, Communication, and Networking (SECON), IEEE, 2015, 9 pages.

(56) References Cited

OTHER PUBLICATIONS

Tullberg et al., "METIS System Concept: The Shape of 5G to Come", URL: https://pdfs.semanticscholar.org/f0cb/be302eed502ff98acd1557649ce23c21c111.pdf, IEEE Communications Magazine, 2015, 13 pages.
Non-Final Office Action received for U.S. Appl. No. 15/923,958 dated Apr. 15, 2019, 39 pages.
Final Office Action received for U.S. Appl. No. 15/923,958 dated Sep. 6, 2019, 49 pages.
Non-Final Office Action received for U.S. Appl. No. 16/004,811 dated Nov. 25, 2019, 43 pages.
International Search Report and Written Opinion received for PCT Application Serial No. PCT/US2019/020150 dated Jun. 5, 2019, 17 pages.
Final Office Action received for U.S. Appl. No. 15/923,958 dated Jun. 25, 2020, 48 pages.
Non-Final Office Action received for U.S. Appl. No. 16/366,254 dated Jul. 21, 2020, 50 pages.
Non-Final Office Action received for U.S. Appl. No. 16/245,635 dated Aug. 3, 2020, 63 pages.
International Preliminary Report on Patentability received for PCT Application Serial No. PCT/US2019/020150 dated Oct. 1, 2020, 11 pages.
Non-Final Office Action received for U.S. Appl. No. 15/923,958 dated Dec. 15, 2020, 56 pages.
Final Office Action received for U.S. Appl. No. 15/923,958 dated Mar. 12, 2021, 60 pages.
Non-Final Office Action received for U.S. Appl. No. 15/923,958 dated Feb. 26, 2020, 40 pages.
International Search Report and Written Opinion received for International Application Serial No. PCT/US2020/012269 dated Apr. 17, 2020, 18 pages.
AT&T: "Resource allocation mechanism", 3GPP Draft; R1-1812872 Resource Allocation Mechanism, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018 Nov. 16, 2018, Nov. 11, 2018 (Nov. 11, 2018), XP051554834, Retrieved from the Internet: URL:http://www.3gpp.org/ftp/Meetings%5F3GPP%5FSYNC/RAN1/Docs/R12D1812872%2Ezip [retrieved on Nov. 11, 2018] sections 1-6.

* cited by examiner

GENERIC CONTROL CHANNEL CONFIGURATION FOR NEW RADIO SIDELINK

CROSS-REFERENCE TO RELATED APPLICATIONS

This application is a non-provisional of pending U.S. Provisional Patent Application No. 62/765,139, filed on Aug. 17, 2018 entitled "GENERIC CONTROL CHANNEL CONFIGURATION FOR NEW RADIO SIDELINK." The entirety of the aforementioned application is hereby incorporated herein by reference.

TECHNICAL FIELD

The subject application is related to wireless communication systems, and, for example, to fifth generation (5G, sometimes referred to as New Radio (NR)) cellular wireless communications systems in which local transmissions are scheduled by a local manager.

BACKGROUND

In traditional wireless cellular communications systems, a given geographic area is served by a single base station. The range of its transmitter, the "coverage," determines the "cell," i.e., the geographic area in which user equipment (UE) can be served by the base station. By arranging a plurality of base stations in such a way that their coverage areas (the cells), partially overlap, ubiquitous coverage can be achieved in which user equipment can move through the network and at any given time is served by one base station. When the user equipment travels towards the edge of one base station's coverage area and into the coverage area of another base station, mobility procedures commonly referred to as "handovers" provide seamless connectivity during the time when the user equipment is disconnecting from the first base station and connecting to the second base station. Nevertheless, at any given time, the user equipment is served by a single base station.

In next-generation wireless cellular communications systems, new services, such as vehicular services, are changing this paradigm. For example, sidelink technology provides for local (e.g., vehicle-to-vehicle) traffic. Such local traffic can be managed by a scheduler node (e.g., another vehicle) referred to as the "Node-S," which can be a local manager of a group of user equipments. The sidelink comprises an interface between two (or more) user equipments, e.g., a transmitter user equipment (Node-T) and a receiver user equipment (Node-R), as scheduled by the Node-S, (in contrast to the downlink and uplink interfaces between a base station and a user equipment and a user equipment and a base station, respectively).

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
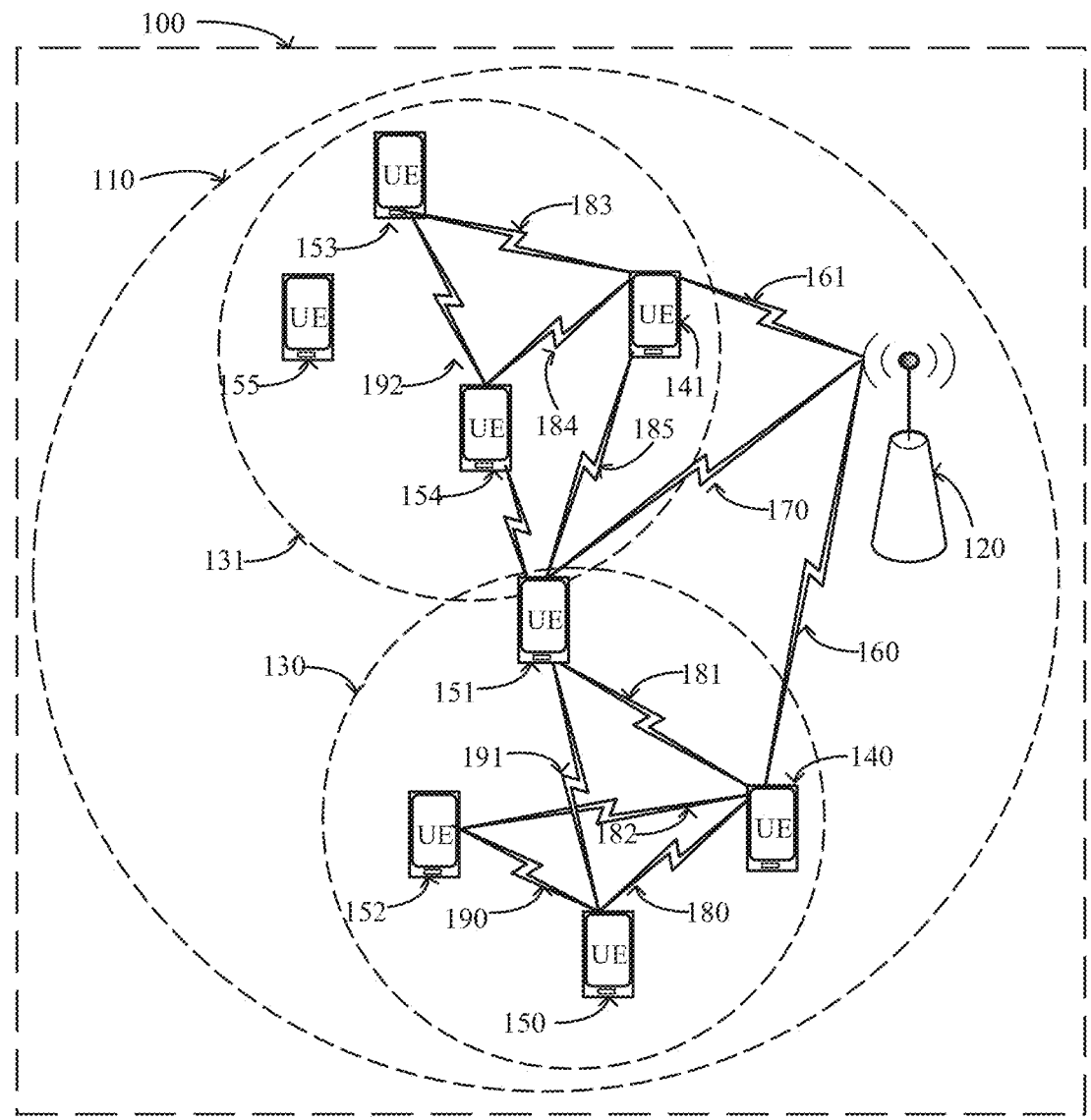
FIG. 1 illustrates an example wireless three-party communication system including scheduling nodes, transmitting nodes and receiving nodes that can communicate via sidelink transmissions, in accordance with various aspects and embodiments of the subject disclosure.

Aspects of the technology described herein are directed to an omni-directional generic control channel framework, such as for use in a three party wireless communication system. In one or more aspects, the downlink control information (DCI) and uplink control information (UCI) are combined together as generic control information (GCI); this supports both DCI and UCI between each node. Note that in other three-party communication systems in which downlink and uplink control channels are utilized for control information, the control channel design can be complex because each node needs to handle both downlink and uplink control information. For example, in such other systems, three nodes need to communicate downlink and uplink control information, per node, resulting in six different control channels. Instead, the omni-directional generic control channel technology described herein handles both downlink control information and uplink control information, using a single control channel for the three nodes.

Aspects of the omni-direction control channel design allow separate configurations of channel configuration dataset(s), resource configuration dataset(s) and transmit and receive (Tx/Rx) configuration dataset(s). In one or more implementations, the channel configuration includes the encoding method, CRC (cyclic redundancy check) bits, RNTI (Radio Network Temporary Identifier), and sequence (sequence selection channel). The resource configuration includes the frequency domain resource allocation physical resource blocks, PRBs) for the control channel. The Tx/Rx configuration includes/defines the payload size, aggregation level and blind decoding times.

When linked together, a combination of a channel configuration, a resource configuration and a Tx/Rx configuration precisely defines the control information's transmission and reception properties. Moreover, one or both of the links that form one group of configuration datasets can be changed to reconfigure the control information's transmission and reception properties.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

As exemplified in FIG. 1, a wireless cellular communications system 100 is depicted. A base station 120 provides coverage in geographic area 110 comprising the cell. Air interfaces 160, 161, 170 provide downlink and uplink communication links for UEs 140, 141, 150, respectively. Note that all UEs 140, 141, 150, 151, 152, 153, 154, 155 can be assumed to have uplink/downlink communication links with base station 120, although this is not expressly depicted in FIG. 1 for purposes of readability.

Air interfaces 180, 181, 182, 183, 184, 185, 190, 191, 192 provide sidelink connectivity between two given UEs. A local manager, referred to herein as Node-S, locally controls transmissions on the sidelink within an area (or other grouping) associated with the Node-S. In the example of FIG. 1, a Node-S 140 controls sidelink transmissions in area 130, and a Node-S 141 controls sidelink transmissions in area 131. In general, a Node-S, such as the Node-S 140, sends common downlink control information (DCI) to a transmitting node (Node-T, such as the node 150) and the receiving node(s), i.e., one or more Node-R(s), such as the node 152. Transmission and reception thus occurs on the sidelink between a plurality of UEs.

In one embodiment, a common downlink control information is sent to the transmitting (Node-T) and receiving (Node-R) nodes. For example, the Node-S 140 may send downlink control information to the nodes 150, 151, 152 via the sidelinks 180, 181, 182, whereby Node-T 150 subsequently sends data to nodes 151 and 152 via the sidelinks 190, 191. The nodes 151 and 152 in this example are each referred to as a Node-R, because the Node-T 150 in this example transmits to a plurality of Node-Rs; this scenario is called the broadcast or multicast scenario. In another example, the Node-S 141 may send downlink control information to the nodes 153, 154 via sidelinks 183,184 whereby the Node-T 153 subsequently sends data to the Node-R 154 via sidelink 192, e.g., in a unicast transmission.

Note that in this example, the local manager nodes 140, 141, namely the Node-S 140 and the Node-s 141 in the system 100 are configured to be local managers by the base station 120 via links 160, 161, whereby any node can transmit or receive via a sidelink controlled by at least one Node-S. Hence, whether a node is transmitting (in the Node-T state) or receiving (in the Node-R state) is dynamically controlled by a Node-S, based on the downlink control information. Note that it is feasible for a Node-S to be elected as a local (group) manager by a group of user equipment nodes without a base station configuration, at least temporarily.

Figure 2:
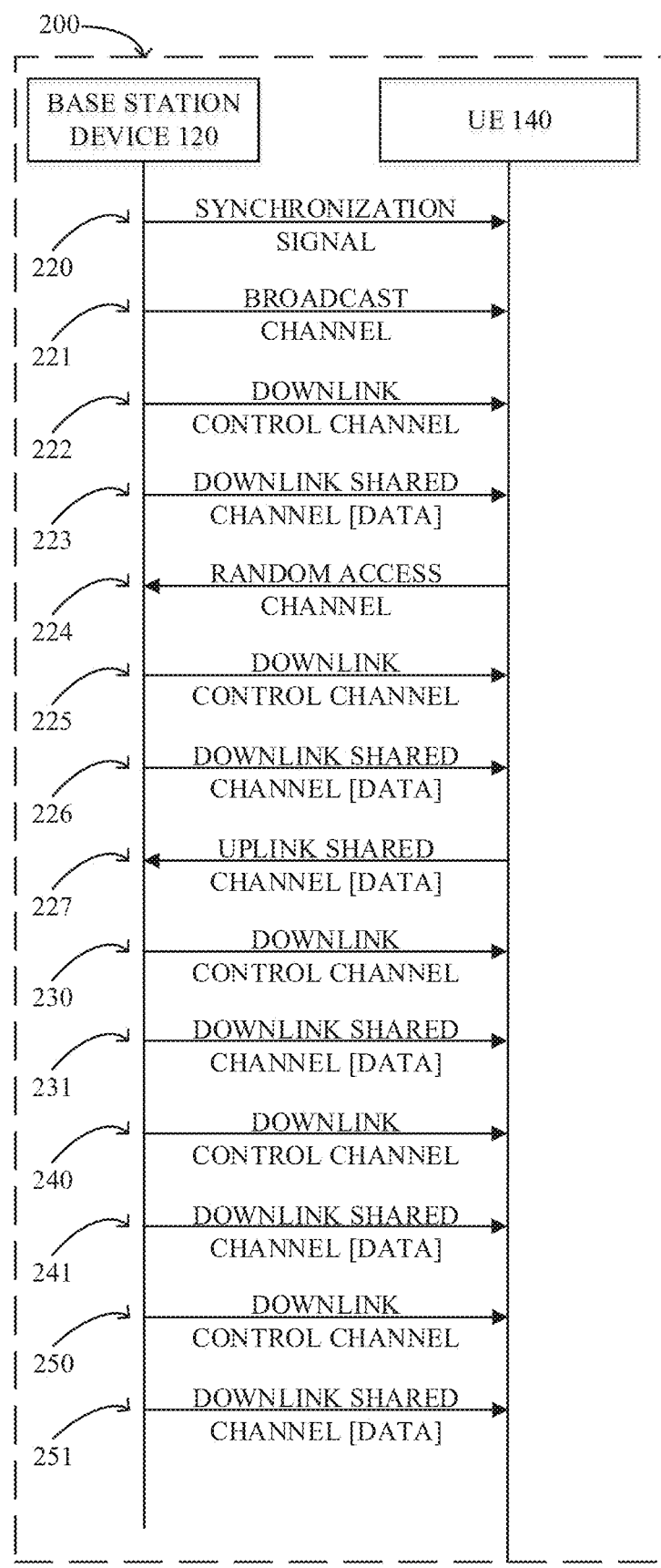
FIG. 2 illustrates an example timing diagram showing communications between a base station and a mobile station device, such as a local manager device, in accordance with various aspects and embodiments of the subject disclosure.

Now referring to FIG. 2, a UE 140 may receive a synchronization signal 220 from a base station 120. The synchronization signal allows the UE 140 to become time and frequency synchronized with base station 120 such that UE 140 can receive waveforms carrying information from base station 120. The synchronization signal may also convey information needed to receive the broadcast channel in 221. Amongst other data, information carried on the broadcast channel configures the UE to receive a downlink control channel 222 for scheduling a downlink shared channel 223. Data transmitted via the downlink shared channel configures the UE to initiate a random access procedure by transmitting a random access channel in 224. The base station schedules a random access response by means of a downlink control channel 225 carried on another downlink shared channel 226. The random access response contains a scheduling assignment and a timing advance for the UE to transmit the first uplink shared channel transmission in 227. The uplink shared channel conveys a user ID. In case of contention resolution during the random access procedure, base station 120 schedules another downlink control channel 230 scheduling a downlink shared channel 231 to resolve contention. Yet another downlink control channel 240 schedules a downlink shared channel 241 to initiate configuration of UE 140 for communication with base station 120. Once UE 140 is fully configured for bi-directional and secure communication with base station 120 via air interface 160, base station 120 sends yet another downlink control channel 250 scheduling a downlink shared channel 251 to initiate configuration of UE 140 as a Node-S.

In one or more implementations, base station 120 configures each Node-S 140, 141 with orthogonal resource pools. Resources are defined in the time and frequency domain. For example, in a wireless communications system employing orthogonal frequency-division multiple access (OFDMA) different Node-S may be assigned different subcarrier indices (frequency domain) and OFDM symbols (time domain) for data transmission. Similarly, the same or different subcarrier indices and OFDM symbols may be configured for control channel transmissions. For control channel transmissions, however, identical time/frequency resources can be configured for multiple Node-Ss, whereby each Node-S is assigned a different search space for control channel transmissions within the identical time/frequency resources. Additional resources may be configured by base station 120 for each Node-S 140, 141, e.g., for physical random access channel (PRACH) and physical uplink control channel (PUCCH) transmissions. These may be used by a Node-S to send scheduling requests or other uplink control information (UCI) such as channel state information (CSI) feedback or HARQ acknowledgements.

Similarly, the base station 120 configures UEs 150, 151, 152, 153, 154, 155 for communication via sidelinks. Unlike Node-S UEs, which are configured by base station 120 as a Node-S via dedicated signaling (e.g. to configure the orthogonal resource pools and search spaces), UEs that transmit and receive via a sidelink but are not configured as a local manager/Node-S—that is, these nodes are controlled by a Node-S rather than being configured as one—can be configured for sidelink communication under the control of a local manager via common signaling. In particular, a given node that is not a Node-S is aware of the resource pools of the Node-S within cell 110. In one embodiment, these nodes are configured by common broadcast signaling from the base station 120, however, configuration by dedicated messages is not precluded. For example, sidelink information including the resource pools of all Node-S in 110 can be included as part of the radio resource control (RRC) setup or reconfiguration of a node 150, 151, 152, 153, 154, 155. Because a given node that is not a Node-S is aware of the resource pools of the one or more Node-S in 110, such a node can receive downlink control information from one or more Node-S in its proximity. This is illustrated in FIG. 1 for UE 151, which can receive from a first Node-S 140 via a first sidelink 181 and from a second Node-S 141 via a second sidelink 185, respectively.

As mentioned herein, the nodes 150, 151, 152, 153, 154, 155 are configured to receive from the Node-S 140, 141 by base station 120. Hence, when monitoring for downlink control information, a given node 150, 151, 152, 153, 154, 155 potentially can receive downlink control information from multiple Node-Ss. This allows for a seamless transition between a local area 130 controlled by a first local manager Node-S 140 and a local area 131 controlled by a second local manager Node-S 141. In particular, such a transition does not require a handover or any other signaling from base station 120.

Described herein is facilitating data transmission via the sidelinks in a wireless communications system 100, whereby the communication via the sidelink is controlled by local traffic managers Node-S 140, 141. Note that in traditional state-of-the-art communications systems, control channel and data channel transmissions are transmitted and received by the same pair of nodes. For example, in FIG. 2, both downlink shared channel and uplink shared channel transmissions are scheduled by base station 120, whereby for the downlink base station 120 is the transmitter and UE 140 is the receiver, and whereby for the uplink, UE 140 is the transmitter and base station 120 is the receiver. Even for the state-of-the-art sidelink, e.g., in the device-to-device (D2D) feature of the Long-Term Evolution (LTE) standard defined by the Third Generation Partnership Project (3GPPP), the control and data transmissions occur between two UEs. In the embodiments described herein, and unlike prior art that exclusively deals with pairs of nodes, a three-party communication sidelink design is provided. The HARQ and scheduling procedures of a three-party communication sidelink design are described herein.

Unlike traditional D2D or vehicle-to-vehicle (V2V) communications systems, which deal with pairs of nodes, in which for a given node the sidelink control channel and the sidelink data channel transmissions occur between the same pair of nodes, in one or more embodiments described herein, downlink control information is transmitted by a Node-S and data is transmitted by a Node-T and received by a Node-R. Generally, Node-S, Node-T, and Node-R are three distinct nodes, however, a scenario in which a Node-S also acts as a transmitter Node-T are not precluded. Furthermore, as discussed herein, whether a node acts as transmitter (Node-T) or receiver (node-R) is generally controlled by the Node-S, depending on whether the downlink control information sent by Node-S and received by a given node instructs the receiving node to transmit (in which case it acts as Node-T) or to receive (in which case it acts as Node-R).

Figure 3:
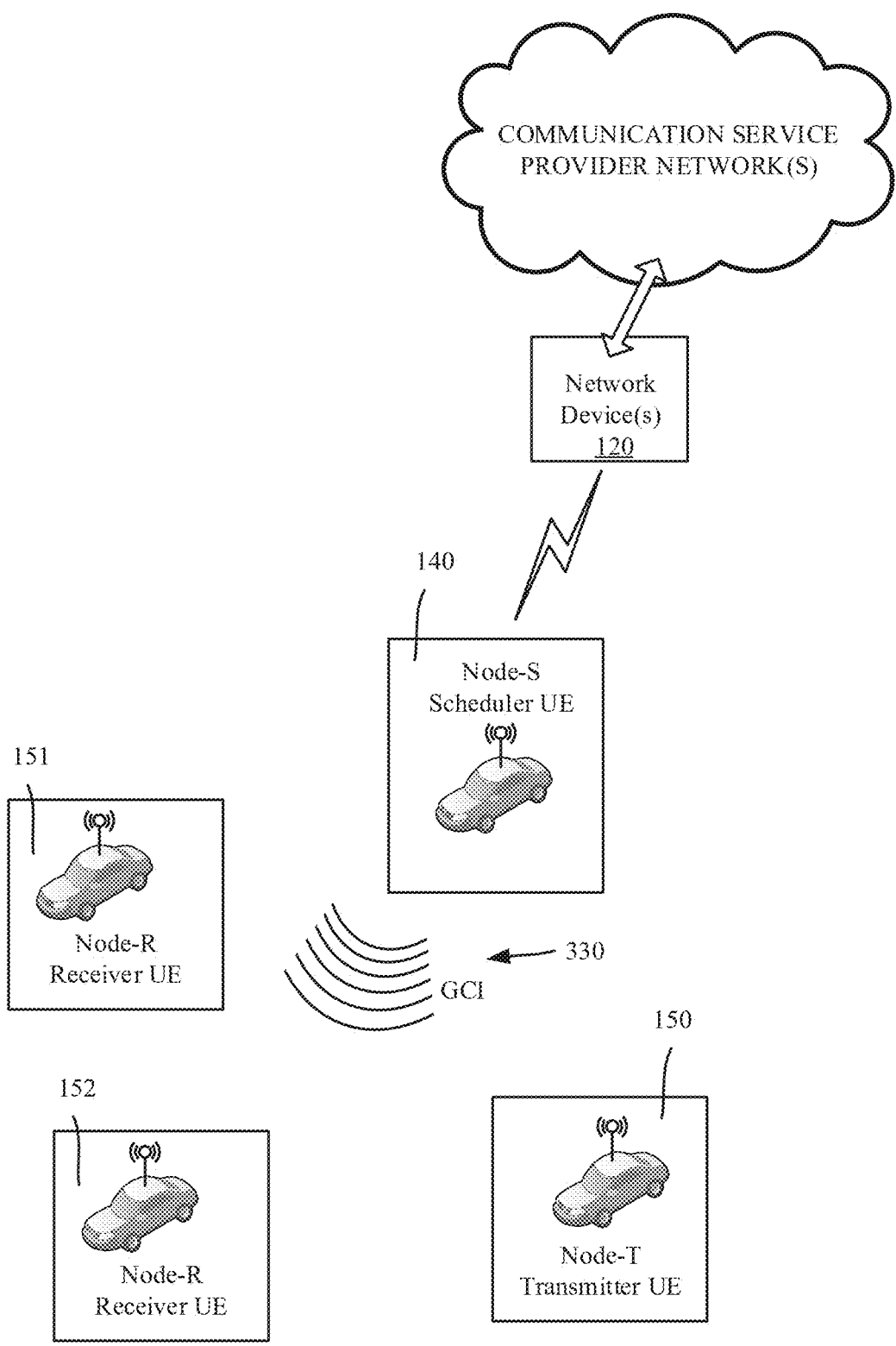
FIG. 3 is an example block diagram representing a local manager device (scheduler node device) sending generic control information over sidelink to a transmitter node and receiver nodes, in accordance with various aspects and embodiments of the subject disclosure.

In general, as the example implementation of FIG. 3 shows, a Node-S such as the Node-S 140 sends Generic Control Information (GCI) 330 to a transmitting node (Node-T, such as the node 150) and the receiving node(s), i.e., one or more Node-R such as the nodes 151 and 152. Transmission and reception of data can thus occur on the sidelink between a plurality of UEs.

Thus, in FIG. 3, a GCI is sent to the transmitting (Node-T) and receiving (Node-R) nodes. For example, the Node-S 140 may send a GCI to nodes 150, 151, 152 via sidelinks 180, 181, 182. Based on this GCI, the Node-T 150 subsequently sends data to nodes 151 and 152 via sidelinks 190, 191. The nodes 151 and 152 in this example are each referred to as a Node-R, because the Node-T 150 in this example transmits to a plurality of Node-R's; this scenario is called the broadcast or multicast scenario.

Also Described herein is a way to include a second GCI in association with the first GCI, in which, for example, the second GCI schedules a Node-R for a transmission to be used to acknowledge reception of the data from the Node-T. Unicast, multicast and broadcast schemes can be implemented.

Note that in the example of FIG. 1, the local manager nodes 140, 141, namely the Node-S's in the system 100, are configured to be local managers by the base station 120 via links 160, 161, whereby any node can transmit or receive via a sidelink controlled by at least one Node-S. Hence, whether a node is transmitting (in the Node-T state) or receiving (in the Node-R state) is dynamically controlled by a Node-S, based on the GCI.

Figure 4:
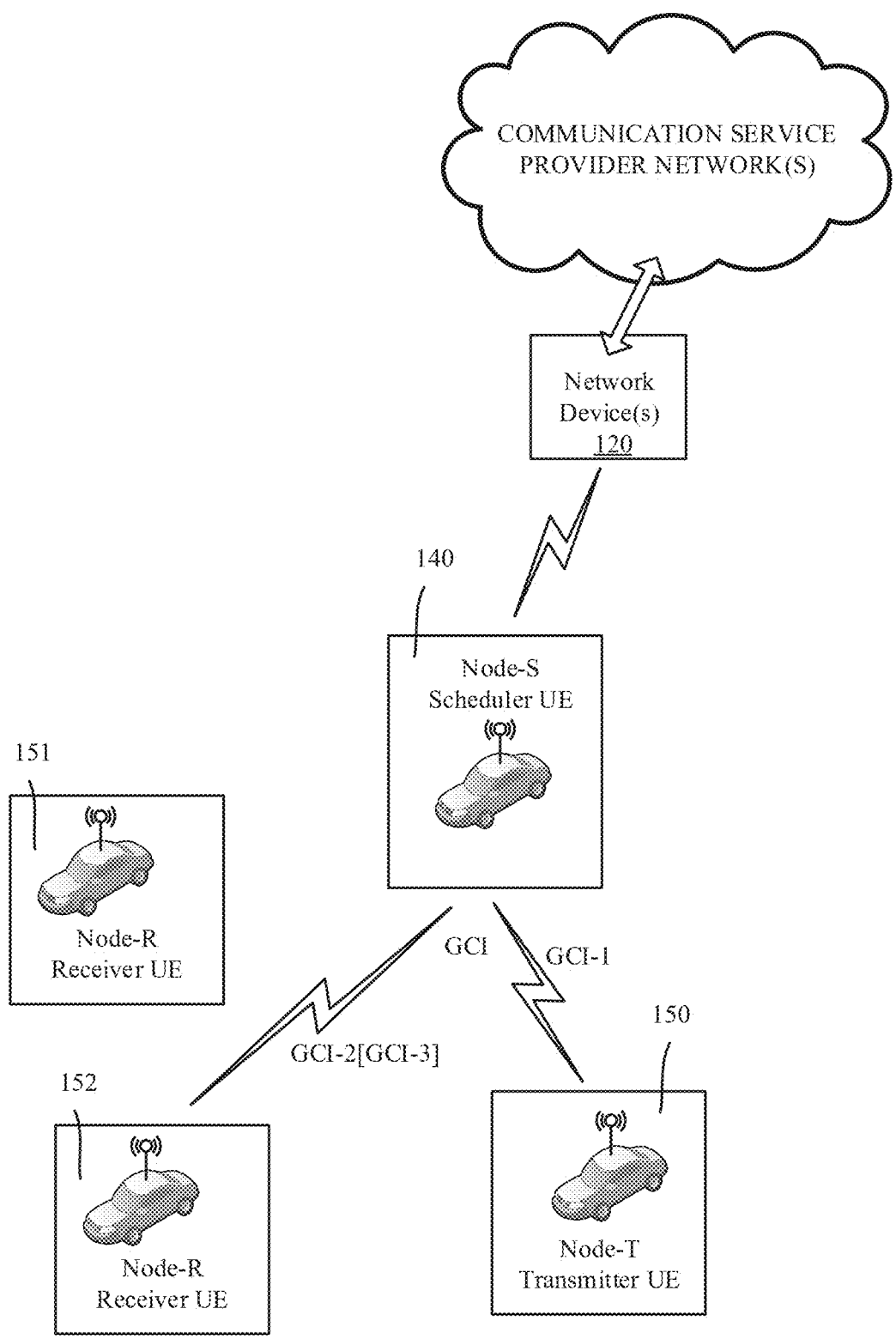
FIG. 4 is an example block diagram representing a local manager device (scheduler node device) scheduling a unicast transmission, via generic control information, over sidelink from a transmitter node to a receiver node, in accordance with various aspects and embodiments of the subject disclosure.

As represented in FIG. 4, the GCI can be a unicast GCI directed to a target recipient, as described herein. In the example of FIG. 4, a GCI (GCI-1) is sent to a transmitter node 150, and another GCI (GCI-2) is sent to a receiver node 152. Note that one GCI can include another GCI, e.g., the GCI-2 that schedules the node-R 152 for receiving data can include another GCI (GCI-2[GCI-3]), in which GCI-3 schedules resources for the node-R 152 to transmit an ACK/NACK when data is received according to GCI-2.

Figure 5:
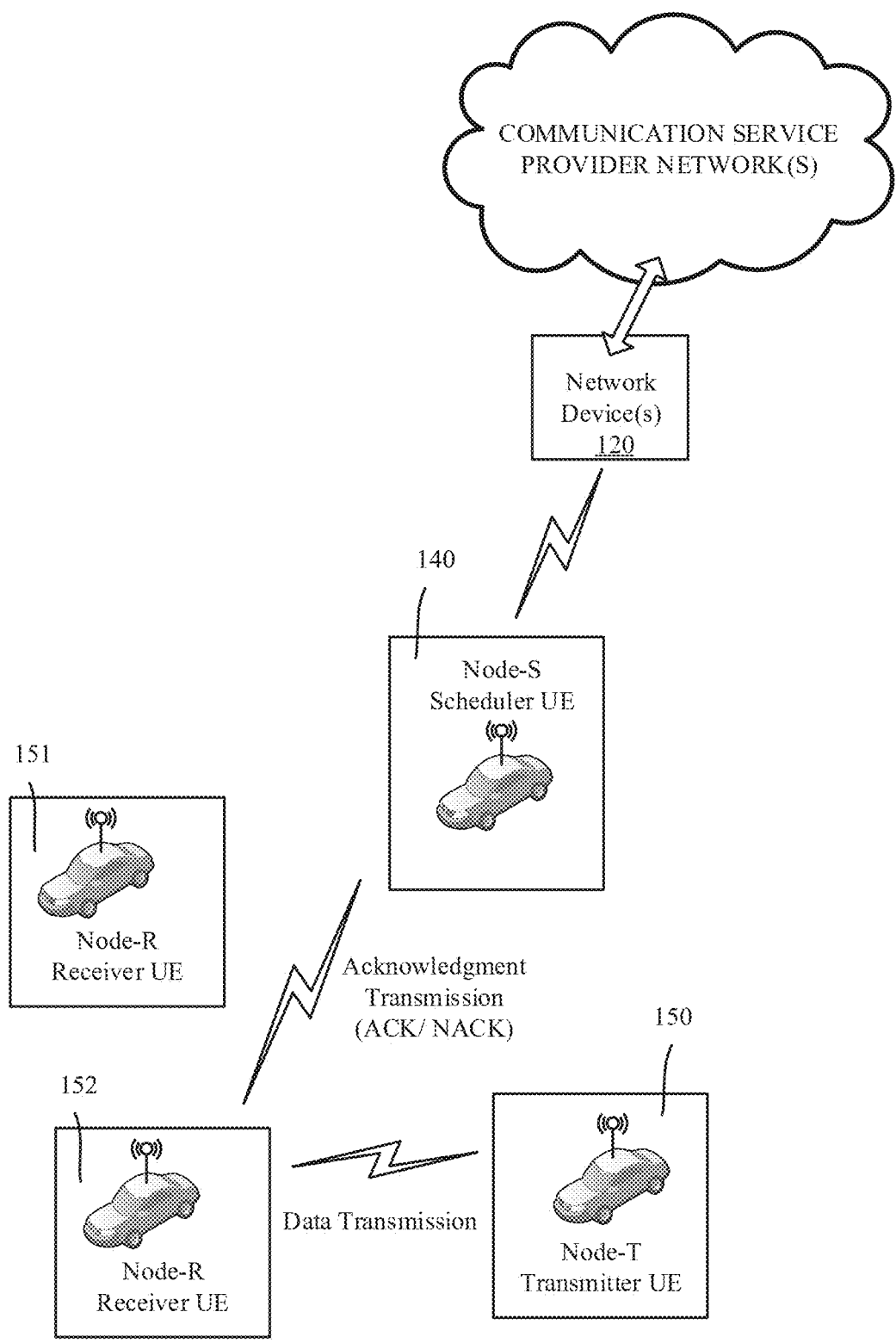
FIG. 5 is an example block diagram representing a unicast transmission over sidelink from a transmitter node to a receiver node as scheduled via generic control information, in accordance with various aspects and embodiments of the subject disclosure.

Thus, in FIG. 4, a GCI is sent to the transmitting (Node-T) and receiving (Node-R) nodes; the GCI can be a common GCI, with a first part GCI-1 intended for the transmitter Node-T 150 and a second part GCI-2[GCI-3] intended for the receiver Node R 152. Based on the GCI, as represented in FIG. 5, the transmitter Node-T 150 sends a data transmission to the receiver Node-R 152, and the receiver Node-R 152 sends an acknowledgment transmission (an ACK or NACK) to the scheduler Node-S 140.

In a similar example based on FIG. 1, the Node-S 141 may send GCI to the nodes 153 and 154 via sidelinks 183, 184 whereby the Node-T 153 subsequently sends data to the Node-R 154 via sidelink 192. A corresponding acknowledgment transmission can be sent from the Node-R 154 via sidelink.

Figure 6:
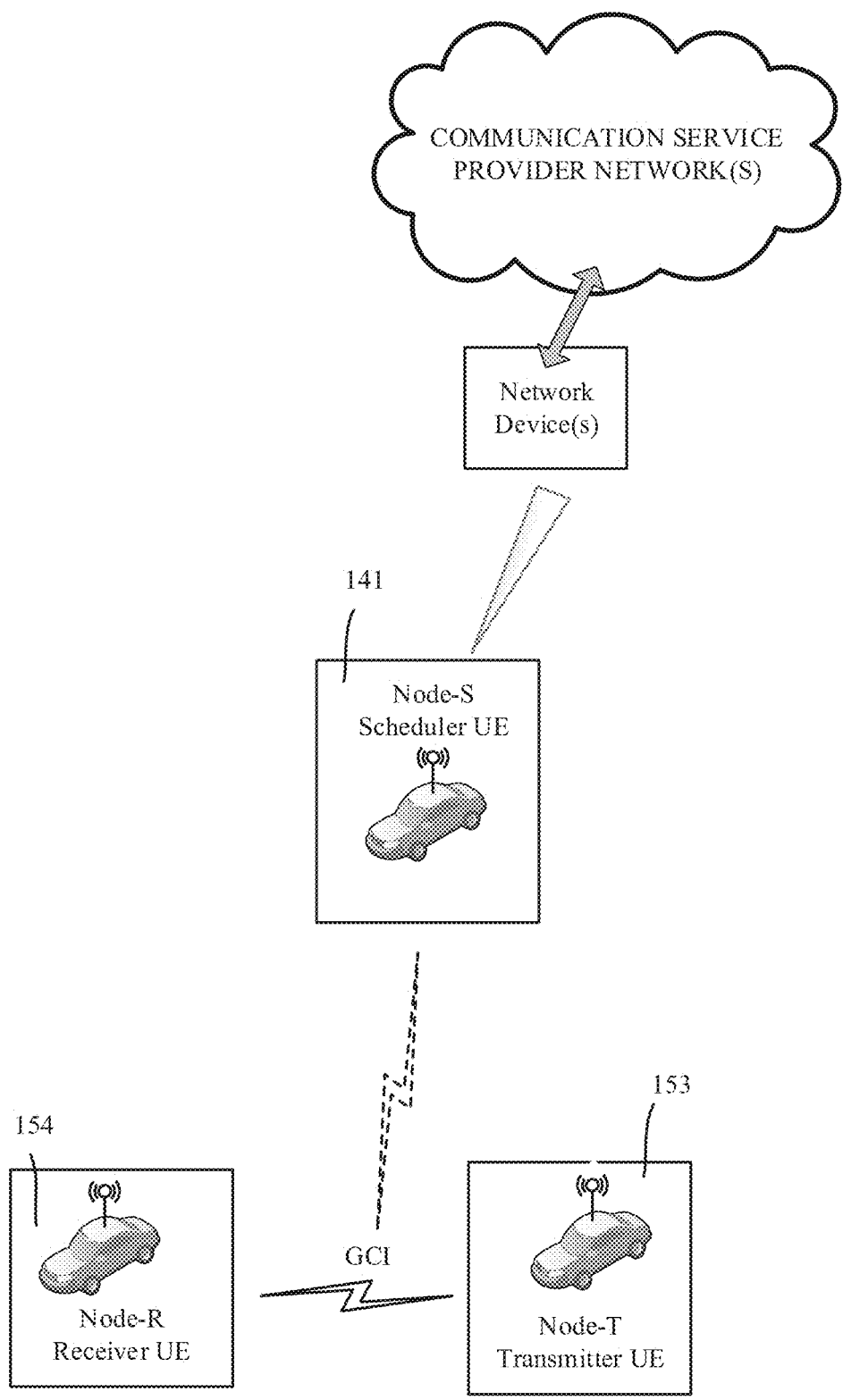
FIG. 6 is an example block diagram representing a transmitter node and a receiver node communicating via generic control information, in accordance with various aspects and embodiments of the subject disclosure.

Moreover, as represented in FIG. 6, a GCI can be sent between two non-scheduling nodes, e.g., the Node-T 153 can send a GCI to the Node-R 154, and vice-versa. It is understood that in general, the scheduling Node-S 141 can listen in on this communication.

Returning to FIG. 1, as mentioned herein, nodes 150, 151, 152, 153, 154, 155 are configured to receive from the Node-S 140, 141 by base station 120. Hence, when monitoring for GCI, a given node 150, 151, 152, 153, 154, 155 may potentially receive GCIs from multiple Node-S's, as well as from a non-scheduling node. This allows for a seamless transition between local area 130 controlled by a first local manager Node-S 140 and local area 131 controlled by a second local manager Node-S 141. In particular, such a transition does not require a handover or any other signaling from base station 120.

Unlike traditional D2D or vehicle-to-vehicle (V2V) communications systems, which deal with pairs of nodes, whereby for a given node the sidelink control channel and the sidelink data channel transmissions occur between the same pair of nodes, in one or more embodiments described herein, information is exchanged between a Node-S, a Node-T and a Node-R. Generally, Node-S, Node-T, and Node-R are three distinct nodes, however, cases where Node-S also acts as Node-T are not precluded. Furthermore, as discussed herein, whether a node acts as a transmitter (Node-T) or a receiver (node-R) is generally controlled by the Node-S, depending on whether GCI sent by Node-S and received by a given node instructs the node to transmit (in which case it acts as Node-T) or to receive (in which case it acts as Node-R).

Turning to additional details of an example GCI, a GCI is generally transmitted on a control channel, e.g., the physical downlink control channel (PDCCH, such as defined in the 3GPP LTE standard). Unicast and multicast/broadcast transmissions of GCI are realized by different radio network temporary identifiers (RNTIs).

As in FIG. 3, a shared channel transmission can be a broadcast transmission. With 3GPP LTE, this transmission carries system information (SI) such as the System Information Block 1 (SIB1) and the System Information Block 2 (SIB2). In this example, a downlink shared channel is scheduled by a PDCCH 222 whose cyclic redundancy check (CRC) bits are scrambled with the SI-RNTI.

As in FIGS. 4 and 5, a shared GCI channel transmission can be a unicast transmission. With 3GPP LTE, this transmission can be scheduled by a PDCCH whose cyclic redundancy check (CRC) bits are scrambled with the cell's different radio network temporary identifier (C-RNTI). The C-RNTI is unique to all UEs in cell 110 (FIG. 1) and is configured by the base station 120 via dedicated RRC signaling. Because in prior systems only the base station can send downlink transmissions, in such systems it sufficed to indicate a receiver in the DCI. For unicast transmissions, this is done by the C-RNTI which indicates for which UE in cell 110 a given PDCCH is intended. For multicast/broadcast transmissions, a common RNTI is used. Hence, the PDCCH is still sent by a dedicated node, the base station, and the common RNTI indicates a plurality of UEs as receivers. Nevertheless, in each case the DCI/RNTI only informs the UE about the intended receiver.

For three-party communications systems as described herein, a GCI is thus described that can indicate both the transmitting and the receiving nodes. In other words, as generally represented in FIGS. 3 and 4, the same GCI can be received by the transmitter (Node-T) and the receiver or receivers (Node-R).

Thus, in one or more embodiments described herein, a common RNTI (radio network temporary identifier) is defined for sidelink transmissions. In one example, all Node-S in cell 110 share the same RNTI. This is possible if resource pools are strictly orthogonal. Alternatively, each Node-S may be configured with its own RNTI. Moreover, the DCI transmitted by a Node-S may contain a Tx-UID and an Rx-UID field, whereby the Tx-UID field determines the transmitting node and the Rx-UID field informs the receiving node(s). For the broadcast/multicast scenario, only a Tx-UID field may be part of the GCI, whereas the group of receivers may be determined based on the RNTI and/or the resource pool associated with the control channel transmission carrying the DCI. For example, a node may detect a GCI transmission by a Node-S with the Tx-UID field set to a value corresponding to another node. Hence, that node knows it is in receiving mode (Node-R).

For the unicast scenario, transmission parameters for the DCI (e.g., part of a GCI) may be uniquely configured for a pair of UEs. The Tx-UID and Rx-UID field are also uniquely assigned to each UE. For instance, the Tx-UID field may be assigned to a first UE and the Rx-UID field may be assigned to a second UE. A first value, e.g., zero, may indicate to transmit and a second value, e.g., one, may indicate to receive. Then {0,1} signals the first UE to transmit and signals the second UE to receive.

Figure 7:
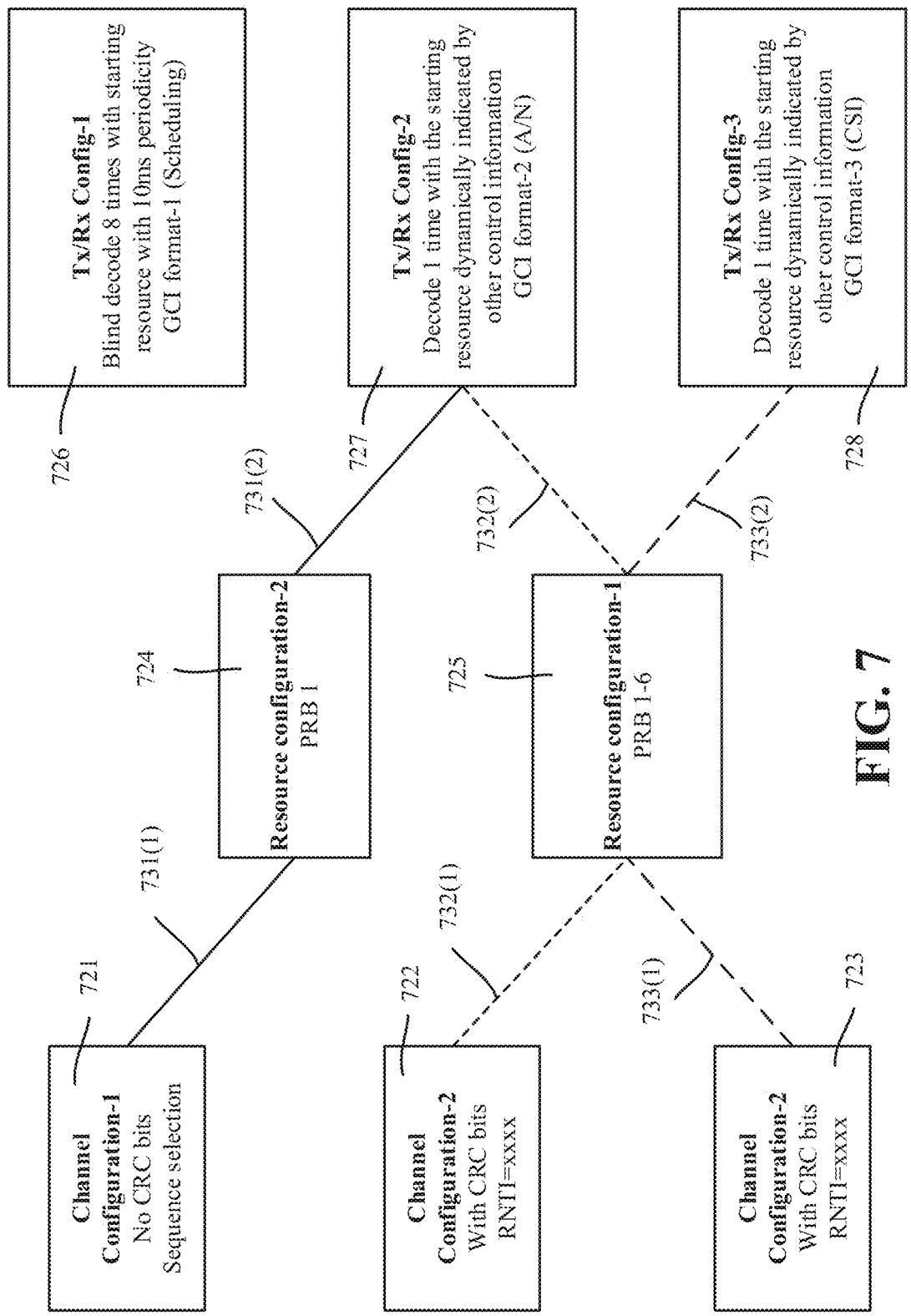
FIG. 7 is an example block diagram representing an omni-direction control channel arrangement/design in which different configuration datasets can be linked in various ways to provide a reconfigurable control channel procedure instance, in accordance with various aspects and embodiments of the subject disclosure.

In one or more aspects, generally represented in FIG. 7, the technology described herein facilitates separate configurations, e.g., via one or more control channel/procedure configurations 721-723, one or more resource configurations 724, 725 and transmission and reception (Tx/Rx) configurations 726-728. A combination of each of these configuration datasets can precisely define the control information's transmission and reception properties. A channel configuration dataset includes the encoding method, CRC bits, RNTI and sequence (sequence selection channel). A resource configuration dataset includes the frequency domain resource allocation (the PRBs to monitor) for the control channel. A Tx/Rx configuration dataset includes the payload size, aggregation level and blind decoding time data/non-blind decoding time data.

To combine the configurations, links may be provided to the user equipment. For example, in FIG. 7 links 731(1) and 731(2) combine the control information transmission and reception datasets in one instance. Similarly, links 732(1) and 732(2) provide another combination, as do links 733(1) and 733(2). The links facilitate the reuse of different instances of the configuration types; a user equipment often can be reconfigured by providing different link information thereto.

Figure 8:
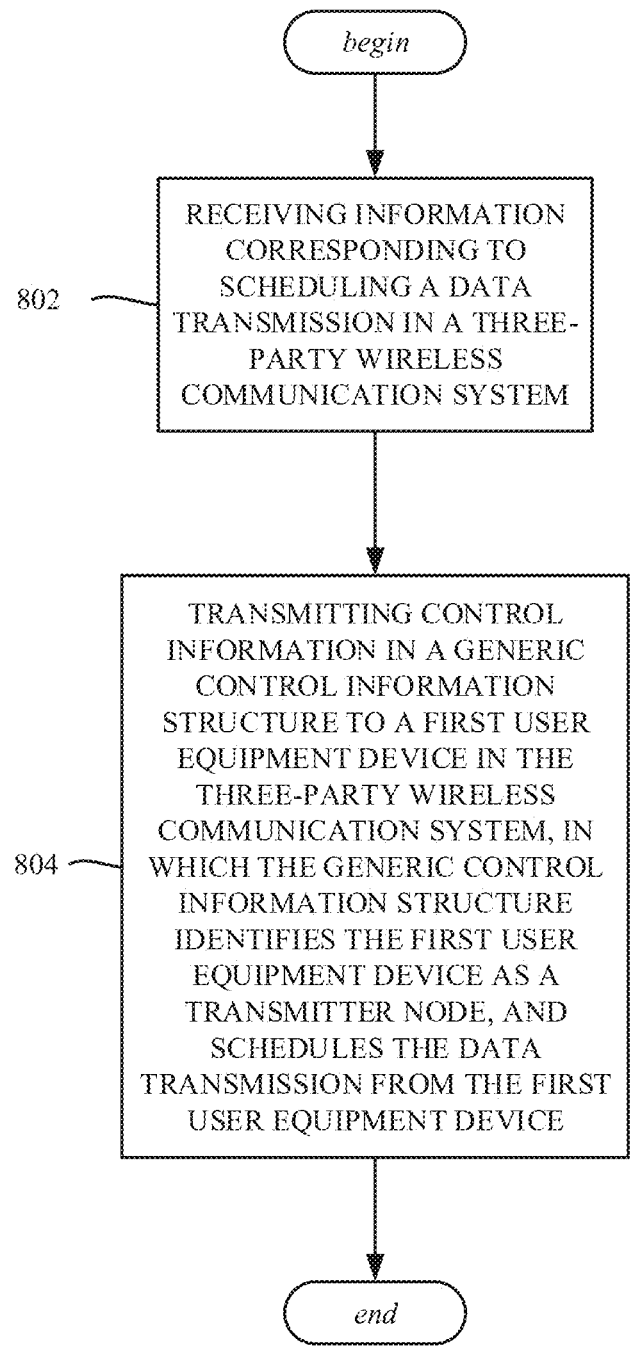
FIG. 8 illustrates example operations of a scheduler node device that transmits generic control information, in accordance with various aspects and embodiments of the subject disclosure.

One or more example aspects are represented in FIG. 8, and can correspond to a node device comprising a processor and a memory that stores executable instructions that, when executed by the processor, facilitate performance of operations and/or components. Example operations comprise operation 802, which represents receiving information corresponding to scheduling a data transmission in a three-party wireless communication system. Operation 804 represents transmitting control information in a generic control information structure to a first user equipment device in the three-party wireless communication system, in which the generic control information structure identifies the first user equipment device as a transmitter node, and schedules a data transmission from the first user equipment device.

Receiving the information that configures the node device as the scheduling node in the three-party wireless communication system can comprise communicating with a base station device.

The generic control information structure can further identify a second user equipment device in the three-party wireless communication system as a receiver node. The generic control information structure can further schedule an acknowledgment transmission by the second user equipment device, wherein the acknowledgment transmission corresponds to the second user equipment receiving the data transmission from the first user equipment device. Further operations can comprise receiving the acknowledgment transmission from the second user equipment device.

The node device can comprise a base station, a relay station or a user equipment device configured as a scheduling node.

Further operations can comprise transmitting a channel configuration dataset, a resource configuration dataset and a transmit and receive configuration dataset to the first user equipment device. The channel configuration dataset can comprise at least one of encoding data, cyclic redundancy check data, radio network temporary identifier data, and/or sequence data, the resource configuration dataset can comprise frequency domain resource allocation information for a control channel, and the transmit and receive configuration dataset can comprise at least one of payload size information, aggregation level data, blind decoding time data, and/or decoding time data.

Further operations can comprise transmitting a first link and a second link to the first user equipment device, in which the first link links the channel configuration dataset to the resource configuration dataset and the second link links the resource configuration dataset to the transmit and receive configuration dataset.

The channel configuration dataset can comprise a first channel configuration dataset; further operations can comprise transmitting a second channel configuration dataset to the first user equipment device, and reconfiguring the first user equipment device by transmitting a third link to the first user equipment device that links the second channel configuration dataset to the resource configuration dataset.

The resource configuration dataset can comprise a first resource configuration dataset; further operations can comprise transmitting a second resource configuration dataset to the first user equipment device, and reconfiguring the first user equipment device by transmitting a third link to the first user equipment device that links the second resource configuration dataset to the transmit and receive configuration dataset.

The transmit and receive configuration dataset can comprise a first transmit and receive configuration dataset; further operations can comprise transmitting a second transmit and receive configuration dataset to the first user equipment device, and reconfiguring the first user equipment device by transmitting a third link to the first user equipment device that links the resource configuration dataset to the second transmit and receive configuration dataset.

Figure 9:
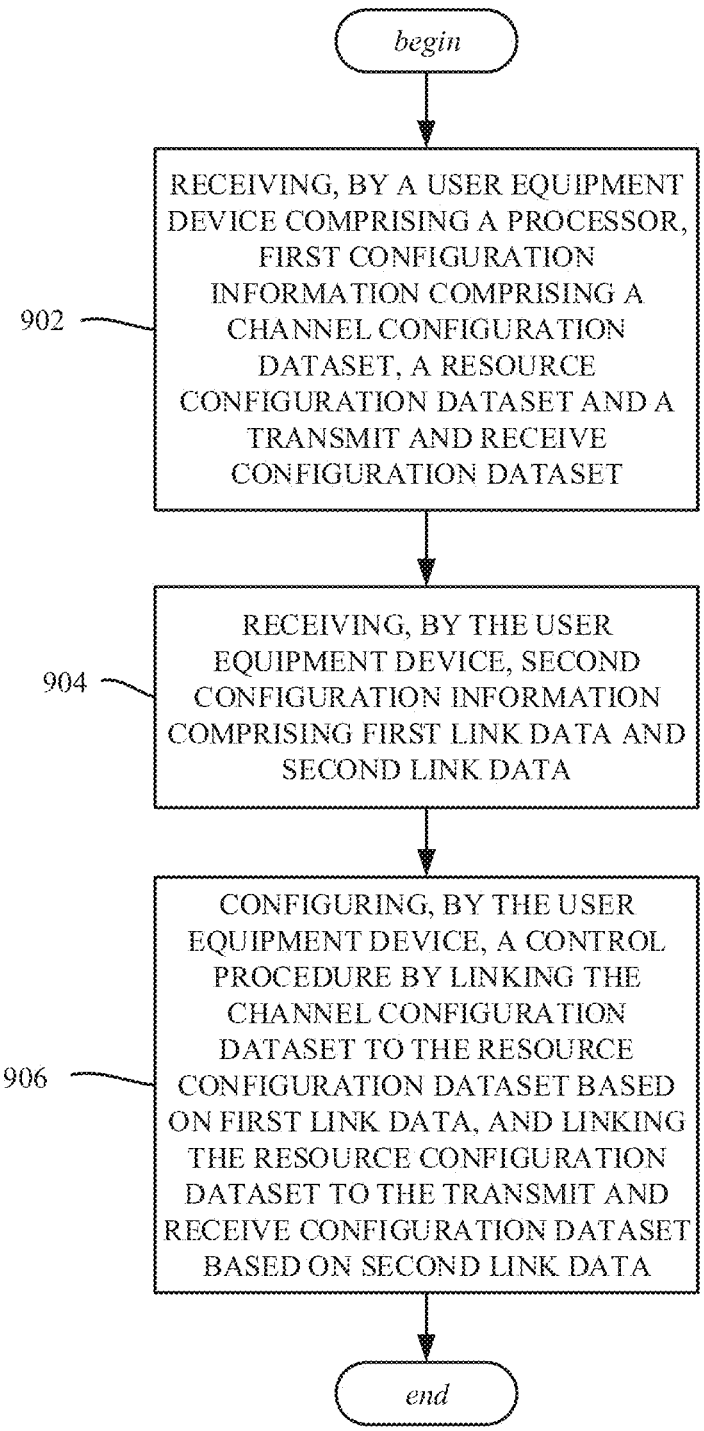
FIG. 9 illustrates example operations of a user equipment device with a configurable control channel procedure instance, in accordance with various aspects and embodiments of the subject disclosure.

One or more aspects, such as those implemented in example operations of a method, are shown in FIG. 9 in accordance with various aspects and embodiments of the subject disclosure. Operation 902 represents receiving, by a user equipment device comprising a processor, first configuration information comprising a channel configuration dataset, a resource configuration dataset and a transmit and receive configuration dataset. Operation 904 represents receiving, by the user equipment device, second configuration information comprising first link data and second link data. Operation 906 represents configuring, by the user equipment device, a control procedure by linking the channel configuration dataset to the resource configuration dataset based on first link data, and linking the resource configuration dataset to the transmit and receive configuration dataset based on second link data.

The channel configuration dataset can comprise a first channel configuration dataset, wherein the resource configuration dataset can comprise a first resource configuration dataset, and wherein the transmit and receive configuration dataset can comprise a first transmit and receive configuration dataset, and further comprising receiving, by the user equipment device, third configuration information comprising at least one of: a second channel configuration dataset, a second resource configuration dataset or a second transmit and receive configuration dataset.

The channel configuration dataset can comprise a first channel configuration dataset, and the control procedure can comprise a first control procedure, and further comprising, receiving, by the user equipment device, a second channel configuration dataset, receiving third configuration information comprising third link data, and configuring a second control procedure based on the third link data by linking the second channel configuration dataset to the resource configuration dataset.

The resource configuration dataset can comprise a first resource configuration dataset, and the control procedure can comprise a first control procedure; aspects can comprise receiving, by the user equipment device, a second resource configuration dataset, receiving third configuration information comprising third link data, and configuring a second control procedure by linking the channel configuration dataset to the second resource configuration dataset based on the third link data.

The resource configuration dataset can comprise a first resource configuration dataset, and the control procedure can comprise a first control procedure; aspects can comprise receiving, by the user equipment device, a second resource configuration dataset, receiving third configuration information comprising third link data, and configuring a second control procedure by linking the second resource configuration dataset to the transmit and receive configuration dataset based on the third link data.

The transmit and receive configuration dataset can comprise a first transmit and receive configuration dataset, and the control procedure can comprise a first control procedure; aspects can comprise receiving, by the user equipment device, a second transmit and receive configuration dataset, receiving third configuration information comprising third link data, and configuring a second control procedure by linking the resource configuration dataset to the second transmit and receive configuration dataset based on the third link data.

Aspects can comprise, receiving, by the user equipment, generic control information via the control procedure, the generic control information can comprise identification information that identifies the user equipment device as a transmitter node and scheduling information schedules a data transmission from the user equipment device, and transmitting the data transmission based on the scheduling information.

Figure 10:
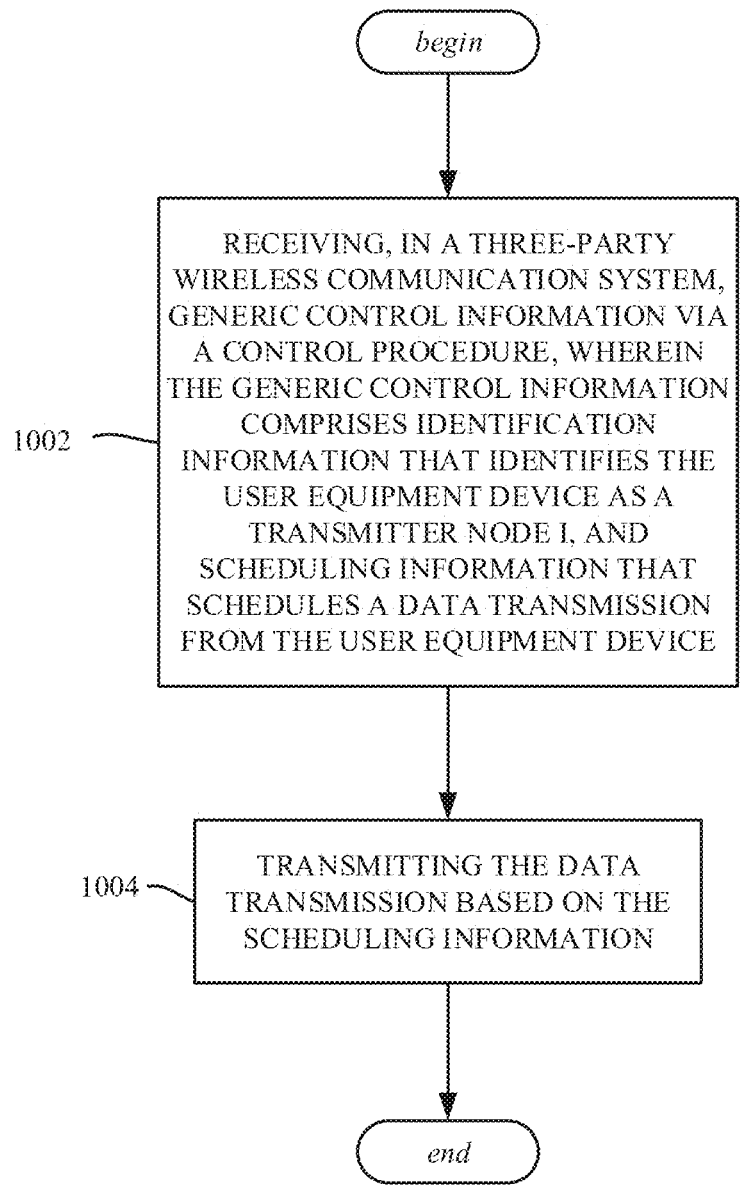
FIG. 10 illustrates example operations of a user equipment device with respect to sending a data transmission based on receiving generic control information, in accordance with various aspects and embodiments of the subject disclosure.

One or more aspects, such as implemented in a machine-readable storage medium, comprising executable instructions that, when executed by a processor of a user equipment, facilitate performance of operations, are represented in FIG. 10. Example operations comprise operation 1002, which represents receiving, in a three-party wireless communication system, generic control information via a control procedure, wherein the generic control information comprises identification information that identifies the user equipment device as a transmitter node in a three-party wireless communication system, and scheduling information that schedules a data transmission from the user equipment device. Operation 1004 represents transmitting the data transmission based on the scheduling information.

Further operations can comprise, receiving a channel configuration dataset group comprising at least one channel configuration dataset, receiving a resource configuration dataset group comprising at least one resource configuration dataset, receiving a transmit and receive configuration dataset group comprising at least one resource configuration dataset, receiving first link information that associates one channel configuration dataset of the channel configuration dataset group with a first resource configuration dataset of the resource configuration dataset group, receiving second link information that associates the first resource configuration dataset of the resource configuration dataset group with a first channel transmit and receive configuration dataset of the transmit and receive configuration dataset group, and configuring the control procedure, comprising linking the one channel configuration dataset to the first resource configuration dataset based on the first link information and linking the first resource configuration dataset to the first channel transmit and receive configuration dataset based on the second link information.

As can be seen, the technology described herein, including the control channel configuration framework, provides for significant flexibility by facilitating separate configurations for the channel, resource and Tx/Rx configuration. The framework facilitates configuring the UE channel, resource and Tx/Rx separately, linking them together for an actual control procedure, thereby effectively and significantly reducing the configuration signaling; multiple control procedures can share the same configuration. The technology facilitates a general control channel framework to cover different formatting and receiving behaviors.

A wireless communication system can employ various cellular systems, technologies, and modulation schemes to facilitate wireless radio communications between devices (e.g., a UE and the network device). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network device) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
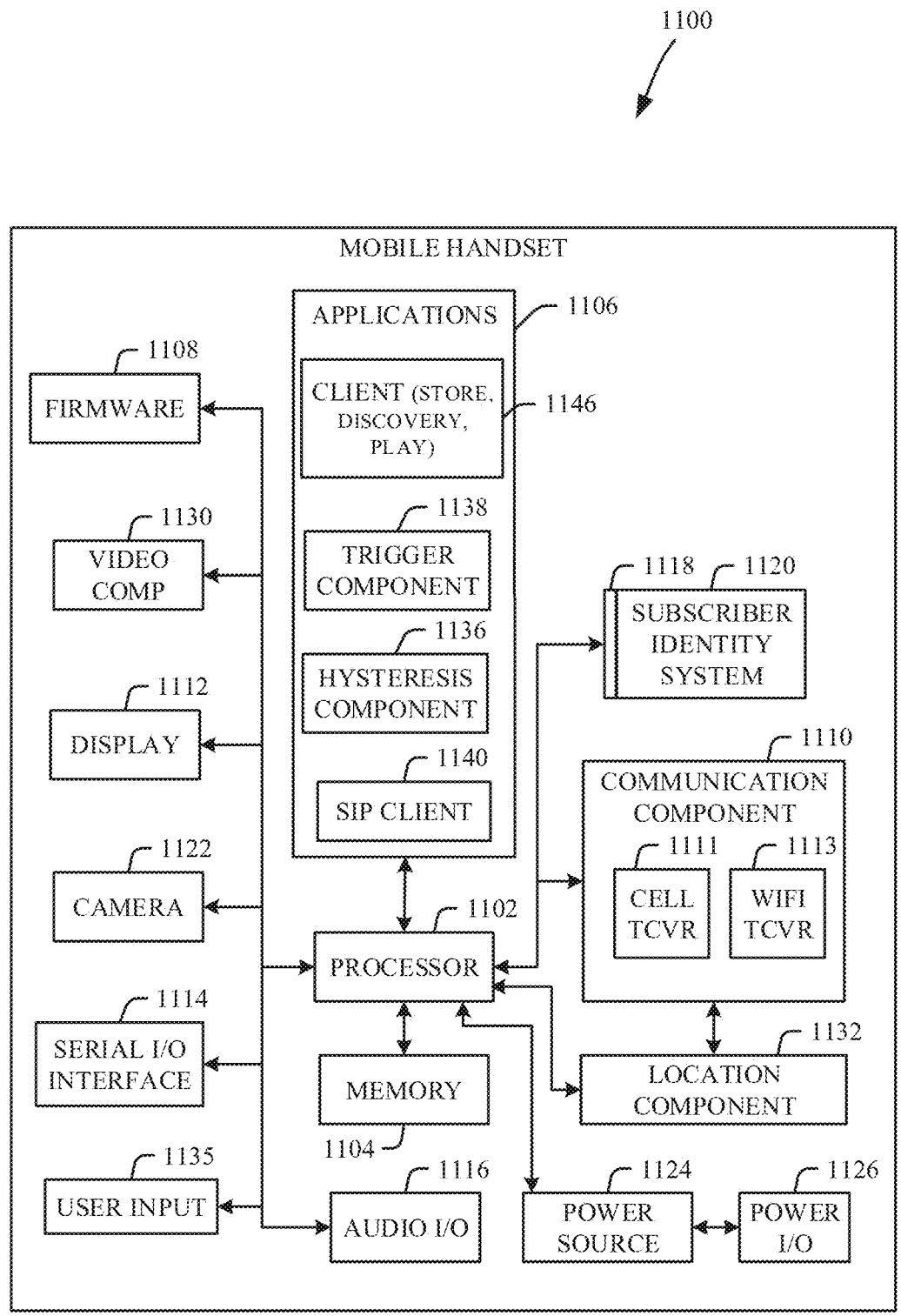
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
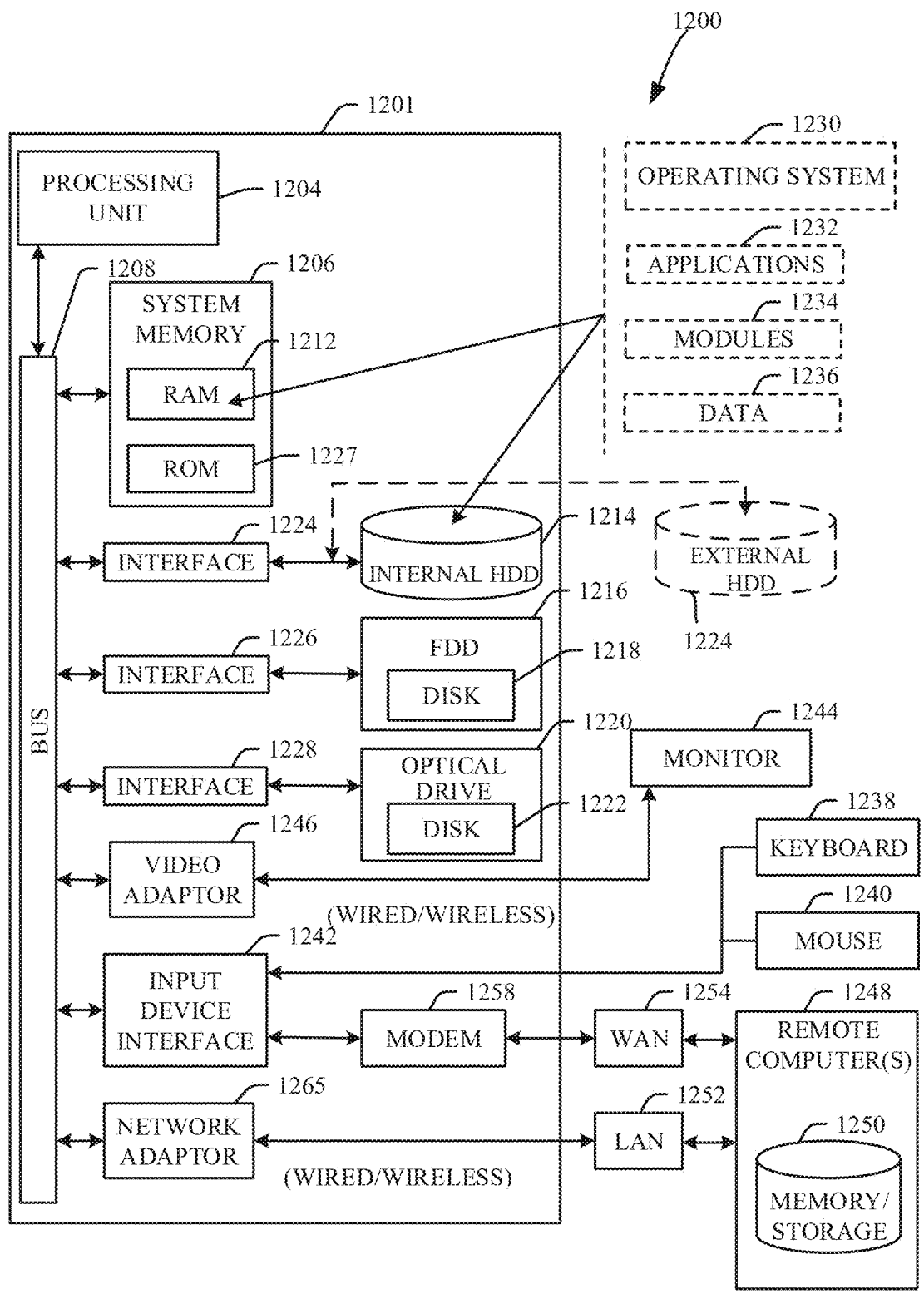
FIG. 12 illustrates an example block diagram of an example computer operable to engage in a system architecture that facilitates wireless communications according to one or more embodiments described herein.

Referring now to FIG. 12, there is illustrated a block diagram of a computer 1200 operable to execute the functions and operations performed in the described example embodiments. For example, a network node (e.g., network node 126, GNB 202, etc.) may contain components as described in FIG. 12. The computer 1200 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the various embodiments can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A node, comprising:
a processor; and
a memory that stores executable instructions that, when executed by the processor, facilitate performance of operations, the operations comprising:
receiving information corresponding to scheduling a data transmission in a three-party communication system;
determining that first generic control information has been transmitted between a first user equipment and a second user equipment;
based on determining that the first generic control information has been transmitted, transmitting second generic control information in a generic control information structure, via a physical downlink control channel, to the first user equipment in the three-party communication system, in which the generic control information structure instructs the first user equipment to behave as a transmitter node, and schedules the data transmission from the first user equipment to the second user equipment, wherein the second generic control information is a unicast transmission, wherein the generic control information structure further schedules an acknowledgment transmission by the second user equipment, and wherein the acknowledgment transmission corresponds to the second user equipment receiving the data transmission from the first user equipment;
in response to transmitting the second generic control information:
monitoring the first user equipment to determine whether the first user equipment has sent the data transmission to the second user equipment, and
monitoring the second user equipment to determine whether the second user equipment has sent the acknowledgment transmission to the first user equipment in response to having received the data transmission;
transmitting a channel configuration dataset, a resource configuration dataset and a transmit and receive configuration dataset to the first user equipment; and
transmitting first link data representative of a first link and second link data representative of a second link to the first user equipment, in which the first link data links the channel configuration dataset to the resource configuration dataset and the second link data links the resource configuration dataset to the transmit and receive configuration dataset.

2. The node of claim 1, wherein the operations further comprise receiving information that configures the node as a scheduling node in the three-party communication system.

3. The node of claim 1, wherein the generic control information structure further identifies the second user equipment in the three-party communication system as a receiver node.

4. The node of claim 3, wherein the operations further comprise:
receiving the acknowledgment transmission from the second user equipment.

5. The node of claim 1, wherein the node comprises a base station, a relay station, or a third user equipment configured as a scheduling node.

6. The node of claim 1, wherein the operations further comprise: configuring a control procedure by linking the resource configuration dataset to the transmit and receive configuration.

7. The node of claim 6, wherein the channel configuration dataset comprises at least one of: encoding data, cyclic redundancy check data, radio network temporary identifier data, or sequence data, wherein the resource configuration dataset comprises frequency domain resource allocation information for a control channel, and wherein the transmit and receive configuration dataset comprises at least one of: payload size information, aggregation level data, blind decoding time data, or decoding time data.

8. The node of claim 1, wherein the operations further comprise: receiving the first generic control information via a physical downlink control channel.

9. The node of claim 8, wherein the channel configuration dataset comprises a first channel configuration dataset, and wherein the operations further comprise, transmitting a second channel configuration dataset to the first user equipment, and reconfiguring the first user equipment by transmitting a third link to the first user equipment that links the second channel configuration dataset to the resource configuration dataset.

10. The node of claim 8, wherein the resource configuration dataset comprises a first resource configuration dataset, and wherein the operations further comprise, transmitting a second resource configuration dataset to the first user equipment, and reconfiguring the first user equipment by transmitting a third link to the first user equipment that links the second resource configuration dataset to the transmit and receive configuration dataset.

11. The node of claim 8, wherein the transmit and receive configuration dataset comprises a first transmit and receive configuration dataset, and wherein the operations further comprise, transmitting a second transmit and receive configuration dataset to the first user equipment, and reconfiguring the first user equipment by transmitting a third link to the first user equipment that links the resource configuration dataset to the second transmit and receive configuration dataset.

12. A method, comprising:
receiving, by a first user equipment comprising a processor, first configuration information comprising a channel configuration dataset, a resource configuration dataset, and a transmit and receive configuration dataset;
determining, by the first user equipment, that first generic control information has been transmitted between a second user equipment and a third user equipment;
receiving, by the first user equipment, second configuration information comprising first link data and second link data;
configuring, by the first user equipment, a control procedure by linking the channel configuration dataset to the resource configuration dataset based on the first link data, and linking the resource configuration dataset to the transmit and receive configuration dataset based on the second link data;
in response to determining that the first generic control information has been transmitted, transmitting, by the first user equipment, second generic control information in a generic control information structure, via a physical downlink control channel, to the second user equipment, in which the generic control information structure instructs the second user equipment to behave as a transmitter node, and schedules configuring the control procedure from the second user equipment to the third user equipment, wherein the second generic control information is a unicast transmission, wherein the second generic control information further schedules an acknowledgment transmission by the third user equipment, and wherein the acknowledgment transmission corresponds to the third user equipment receiving the control procedure from the second user equipment; and
in response to transmitting the second generic control information, monitoring the third user equipment to confirm that the third user equipment has sent the acknowledgment transmission to the second user equipment.

13. The method of claim 12, wherein the channel configuration dataset comprises a first channel configuration dataset, wherein the resource configuration dataset comprises a first resource configuration dataset, and wherein the transmit and receive configuration dataset comprises a first transmit and receive configuration dataset, and further comprising receiving, by the first user equipment, third configuration information comprising at least one of: a second channel configuration dataset, a second resource configuration dataset or a second transmit and receive configuration dataset.

14. The method of claim 12, wherein the channel configuration dataset comprises a first channel configuration dataset, and wherein the control procedure comprises a first control procedure, and further comprising, receiving, by the first user equipment, a second channel configuration dataset, receiving, by the first user equipment, third configuration information comprising third link data, and configuring, by the first user equipment, a second control procedure based on the third link data by linking the second channel configuration dataset to the resource configuration dataset.

15. The method of claim 12, wherein the resource configuration dataset comprises a first resource configuration dataset, and wherein the control procedure comprises a first control procedure, and further comprising, receiving, by the first user equipment, a second resource configuration dataset, receiving, by the first user equipment, third configuration information comprising third link data, and configuring, by the first user equipment, a second control procedure by linking the channel configuration dataset to the second resource configuration dataset based on the third link data.

16. The method of claim 12, wherein the resource configuration dataset comprises a first resource configuration dataset, and wherein the control procedure comprises a first control procedure, and further comprising, receiving, by the first user equipment, a second resource configuration dataset, receiving, by the first user equipment, third configuration information comprising third link data, and configuring, by the first user equipment, a second control procedure by linking the second resource configuration dataset to the transmit and receive configuration dataset based on the third link data.

17. The method of claim 12, wherein the transmit and receive configuration dataset comprises a first transmit and receive configuration dataset, and wherein the control procedure comprises a first control procedure, and further comprising, receiving, by the first user equipment, a second transmit and receive configuration dataset, receiving, by the first user equipment, third configuration information comprising third link data, and configuring, by the first user equipment, a second control procedure by linking the resource configuration dataset to the second transmit and receive configuration dataset based on the third link data.

18. The method of claim 12, wherein the transmitter node is a first transmitter node, and further comprising, receiving, by the first user equipment, the first generic control information via the control procedure, wherein the first generic control information comprises identification information that identifies the first user equipment as a second transmitter node and scheduling information schedules a data transmission from the first user equipment, and transmitting the data transmission based on the scheduling information.

19. A non-transitory machine-readable medium, comprising executable instructions that, when executed by a processor of a first user equipment, facilitate performance of operations comprising:
receiving information corresponding to scheduling a data transmission in a three-party communication system;
receiving, in the three-party communication system, first generic control information via a control procedure, wherein the generic control information comprises identification information that identifies the first user equipment as a first transmitter node in the three-party communication system, and scheduling information that schedules the data transmission from the first user equipment;
determining that first generic control information has been transmitted between a second user equipment and a third user equipment;
based on determining that the first information has been transmitted, transmitting second generic control information in a generic control information structure, via a physical downlink control channel, to the second user equipment in the three-party communication system, in which the generic control information structure instructs the second user equipment to behave as a second transmitter node, and schedules a data transmission from the second user equipment to the third user equipment, wherein the second generic control information is a unicast transmission, wherein the second generic control information schedules an acknowledgment transmission by the third user equipment, and wherein the acknowledgment transmission corresponds to the third user equipment receiving the data transmission from the second user equipment;

transmitting the data transmission based on the scheduling information;

transmitting a channel configuration dataset, a resource configuration dataset and a transmit and receive configuration dataset to the first user equipment;

transmitting first link data representative of a first link and second link data representative of a second link to the first user equipment, in which the first link data links the channel configuration dataset to the resource configuration dataset and the second link data links the resource configuration dataset to the transmit and receive configuration dataset; and in response to transmitting the second generic control information, monitoring the third user equipment to determine whether the third user equipment has sent the acknowledgment transmission to the second user equipment.

20. The non-transitory machine-readable medium of claim 19, wherein the operations further comprise:

receiving a channel configuration dataset group comprising at least one channel configuration dataset;

receiving a resource configuration dataset group comprising at least one resource configuration dataset;

receiving a transmit and receive configuration dataset group comprising at least one resource configuration dataset;

receiving first link information that associates one channel configuration dataset of the channel configuration dataset group with a first resource configuration dataset of the resource configuration dataset group;

receiving second link information that associates the first resource configuration dataset of the resource configuration dataset group with a first channel transmit and receive configuration dataset of the transmit and receive configuration dataset group; and configuring the control procedure, comprising:

linking the one channel configuration dataset to the first resource configuration dataset based on the first link information, and linking the first resource configuration dataset to the first channel transmit and receive configuration dataset based on the second link information.

* * * * *